United States Patent
Kang

(10) Patent No.: US 8,065,500 B2
(45) Date of Patent: Nov. 22, 2011

(54) DEVICE FOR PROCESSING INFORMATION AND WORKING METHOD THEREOF

(75) Inventor: Byung Suk Kang, Seoul (KR)

(73) Assignees: LG Electronics Inc., Seoul (KR); Iocell Corporation, Suwon-Si (KR)

( * ) Notice: Subject to any disclaimer, the term of this patent is extended or adjusted under 35 U.S.C. 154(b) by 126 days.

(21) Appl. No.: 12/577,140

(22) Filed: Oct. 9, 2009

(65) Prior Publication Data

US 2010/0095079 A1    Apr. 15, 2010

Related U.S. Application Data

(63) Continuation of application No. 12/089,186, filed as application No. PCT/KR2007/000528 on Jan. 31, 2007, now Pat. No. 7,797,504.

(30) Foreign Application Priority Data

Dec. 20, 2006    (KR) .......................... 10-2006-0130958

(51) Int. Cl.
*G06F 12/00*    (2006.01)

(52) U.S. Cl. ........ 711/173; 711/103; 711/162; 711/163; 711/170

(58) Field of Classification Search .......................... None
See application file for complete search history.

(56) References Cited

U.S. PATENT DOCUMENTS

| | | | |
|---|---|---|---|
| 4,400,798 A | 8/1983 | Francis et al. | |
| 5,596,738 A | 1/1997 | Pope | |
| 5,606,660 A | 2/1997 | Estakhri et al. | |
| 5,930,504 A | 7/1999 | Gabel | |
| 6,282,709 B1 | 8/2001 | Reha et al. | |
| 6,330,653 B1 | 12/2001 | Murray et al. | |
| 6,385,729 B1 | 5/2002 | DiGiorgio et al. | |
| 6,553,492 B1 | 4/2003 | Hosoe | |
| 6,697,944 B1 | 2/2004 | Jones et al. | |
| 6,754,828 B1 | 6/2004 | Marisetty et al. | |
| 6,804,773 B1 | 10/2004 | Grigsby et al. | |
| 6,986,030 B2 | 1/2006 | Shmueli et al. | |
| 6,996,005 B2 | 2/2006 | Mori et al. | |

(Continued)

FOREIGN PATENT DOCUMENTS

JP    2000-357126    12/2000

(Continued)

OTHER PUBLICATIONS

Microsoft Corporation, "How to recover from a corrupted registry that prevents Windows XP from starting", Archive.org date of Oct. 20, 2004, http://support.microsoft.com/kb/307545.

(Continued)

*Primary Examiner* — Shawn X Gu

(74) *Attorney, Agent, or Firm* — Birch, Stewart, Kolasch & Birch, LLP

(57) ABSTRACT

A device for processing information and the working method of the same are provided. The device for processing information comprises: a memory in which logic for driving a firmware is stored; a connector for connecting the memory to an external device; and a control unit for providing an interface with a host, for communicating with the host through the connector, and for reading and recording data on the memory. The control unit comprises: a first storing device in which a routine for calling the firmware logic stored in the memory is stored; and a processor for executing the firmware logic, stored in the memory, using the routine stored in the first storing device.

17 Claims, 12 Drawing Sheets

U.S. PATENT DOCUMENTS

| | | | |
|---|---|---|---|
| 7,134,006 | B2 | 11/2006 | Flanigan |
| 7,298,649 | B2 | 11/2007 | Mori et al. |
| 2002/0095501 | A1 | 7/2002 | Chiloyan et al. |
| 2002/0147882 | A1 | 10/2002 | Pua et al. |
| 2003/0014653 | A1 | 1/2003 | Moller et al. |
| 2004/0255053 | A1 | 12/2004 | Kang |
| 2005/0188278 | A1* | 8/2005 | Zimmer et al. .............. 714/42 |
| 2005/0257016 | A1 | 11/2005 | Boles et al. |
| 2006/0282558 | A1 | 12/2006 | Chen et al. |
| 2008/0046642 | A1 | 2/2008 | Mori et al. |

FOREIGN PATENT DOCUMENTS

| | | |
|---|---|---|
| JP | 2002-149596 A | 5/2002 |
| JP | 2002-182941 A | 6/2002 |
| JP | 2002-288110 A | 10/2002 |
| JP | 2003-067709 | 3/2003 |
| JP | 2003-101833 A | 4/2003 |
| JP | 2003-114859 | 4/2003 |
| JP | 2003-162433 A1 | 6/2003 |
| JP | 2005-266934 A | 9/2005 |
| KP | 10-2004-0037709 | 5/2004 |
| KR | 10-2003-0010986 A | 2/2003 |
| KR | 10-2003-0027924 A | 4/2003 |
| KR | 2003-0029550 | 4/2003 |
| KR | 2003-0031527 A | 4/2003 |
| KR | 10-2003-0059773 | 7/2003 |
| KR | 2003-0061564 | 7/2003 |
| KR | 10-2003-0073824 A | 9/2003 |
| KR | 10-0424993 B1 | 3/2004 |
| KR | 10-2004-0076589 A | 9/2004 |
| KR | 10-2004-0085793 A | 10/2004 |
| KR | 10-2005-0004403 A | 1/2005 |
| KR | 10-0800589 B1 | 1/2008 |
| WO | WO-01/79971 A2 | 10/2001 |
| WO | WO-02/27572 A1 | 4/2002 |

OTHER PUBLICATIONS

Caesar, "Managing (& Disabling) Windows File Protection (WFP)", Jul. 28, 2000, Ars Technica.com, Archive.org date of Aug. 15, 2000, http://arstechnica.com/tweak/win2K/others/disable_sfp-1.html.

* cited by examiner

[Figure 1]
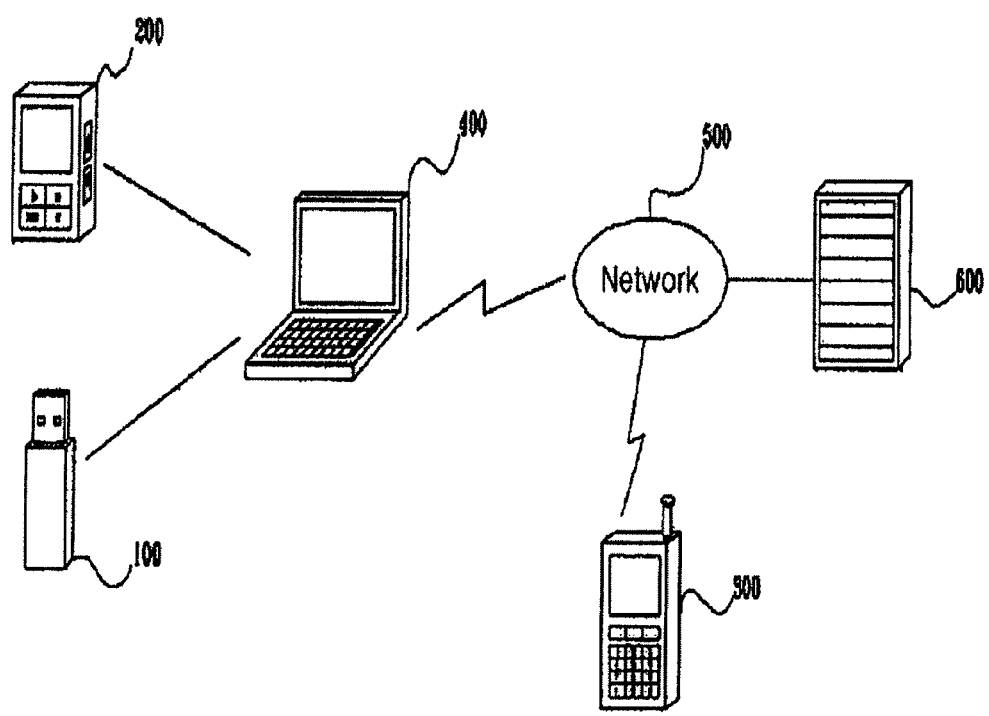

[Figure 2]
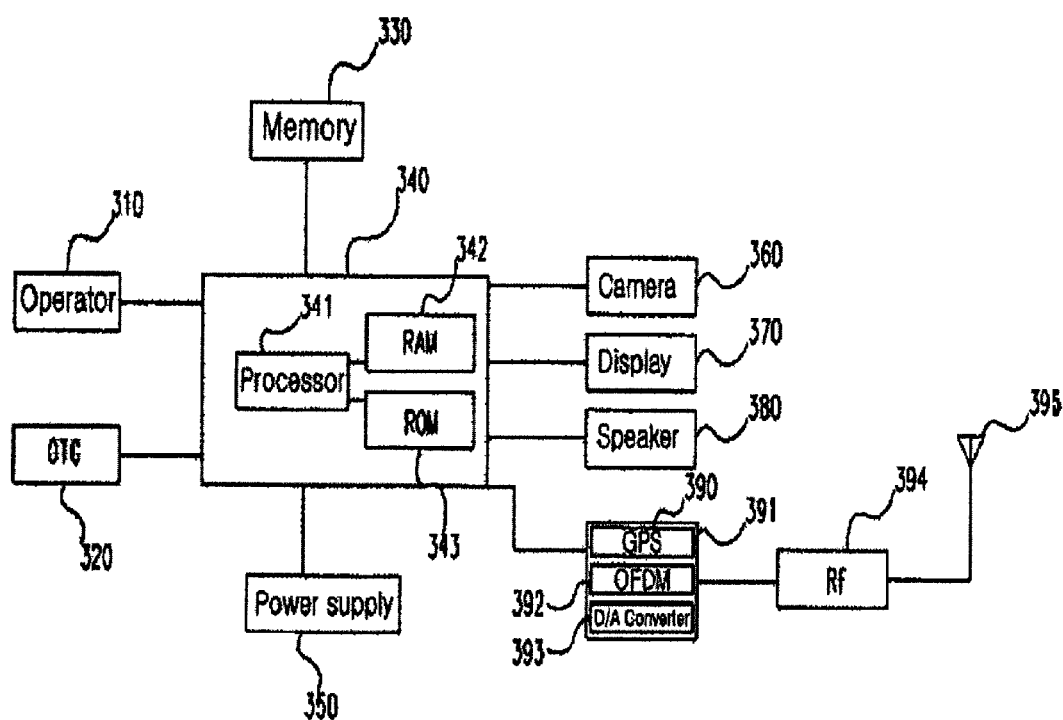

[Figure 3]
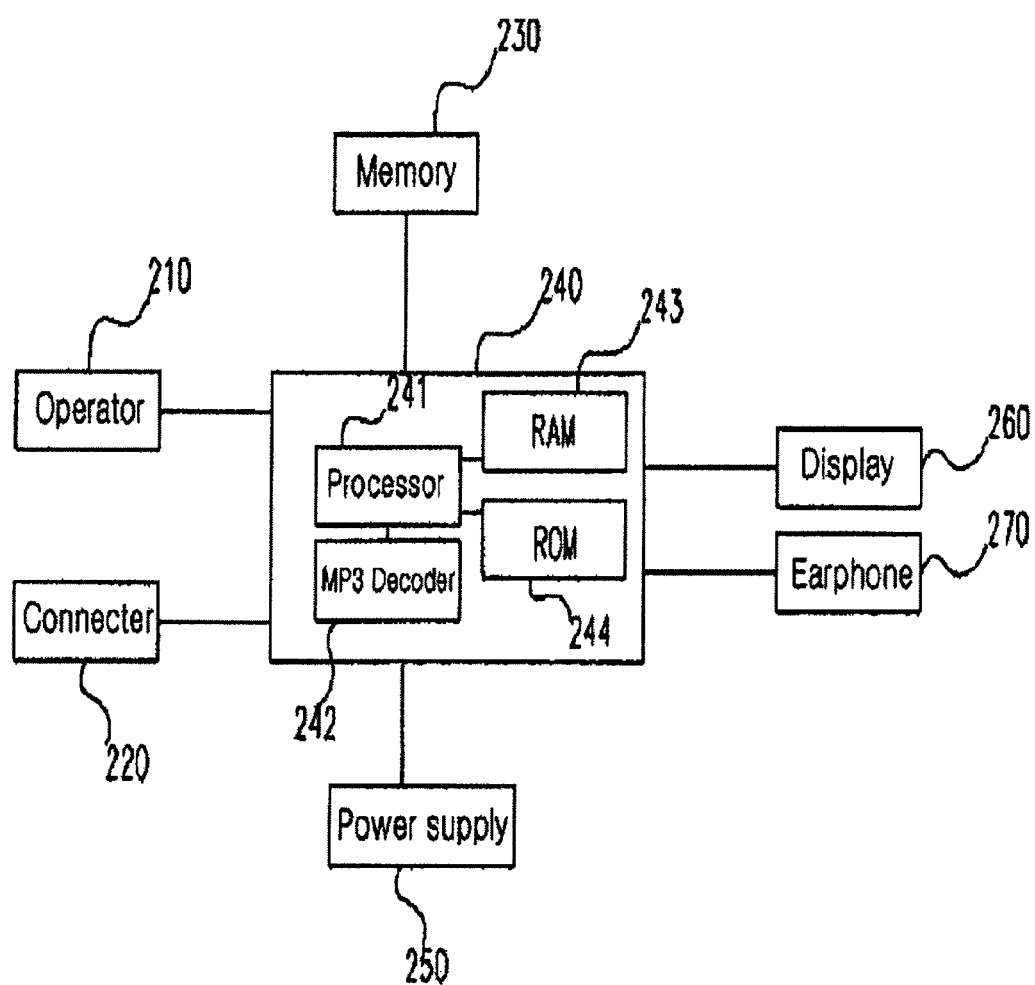

[Figure 4]
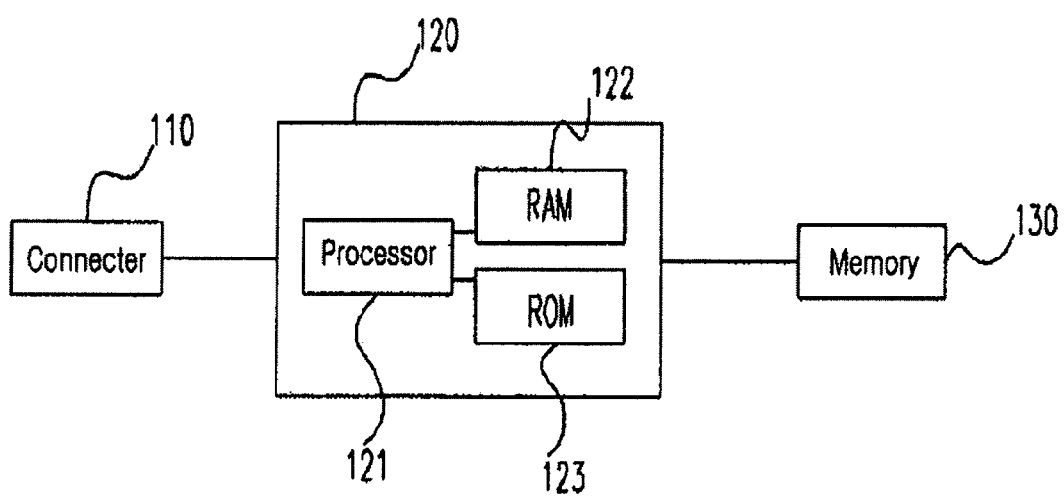

[Figure 5]
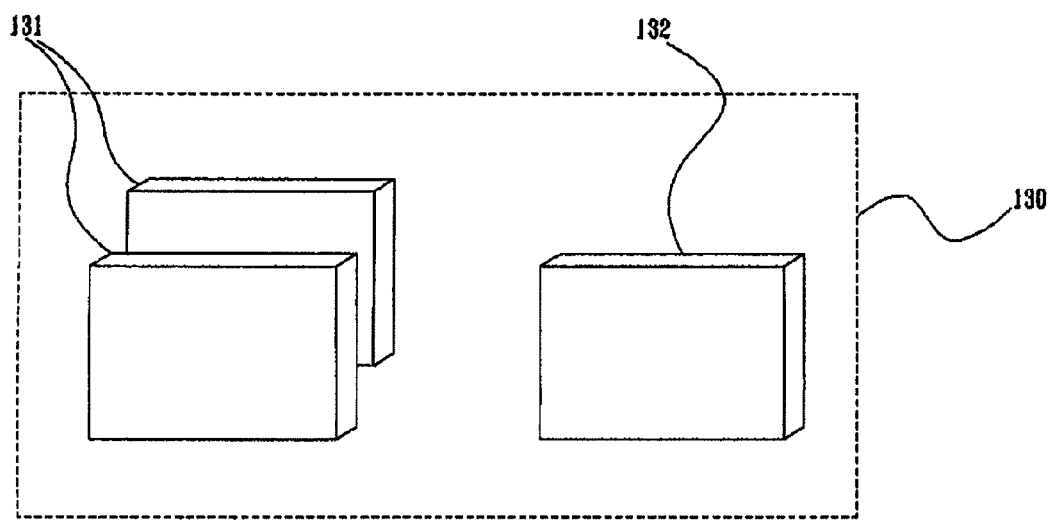

[Figure 6]
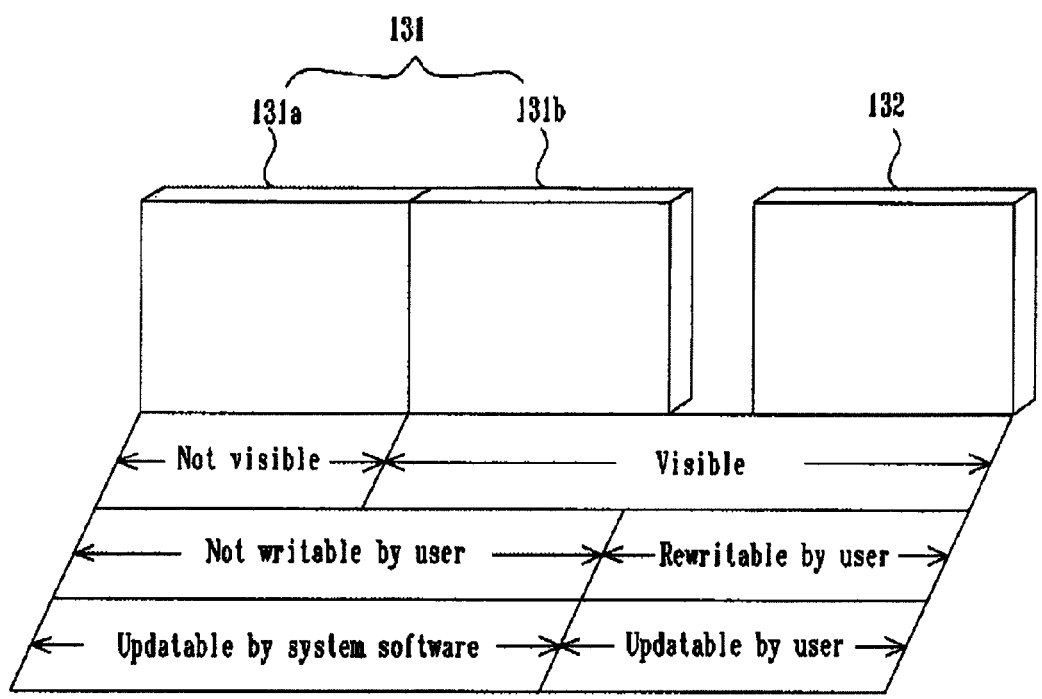

[Figure 7]
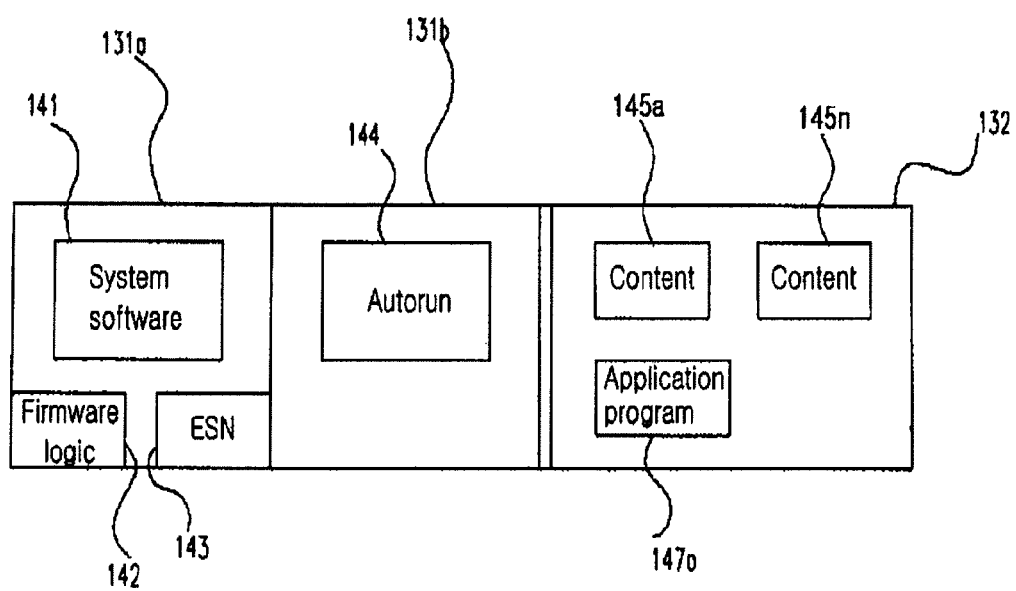

[Figure 8]
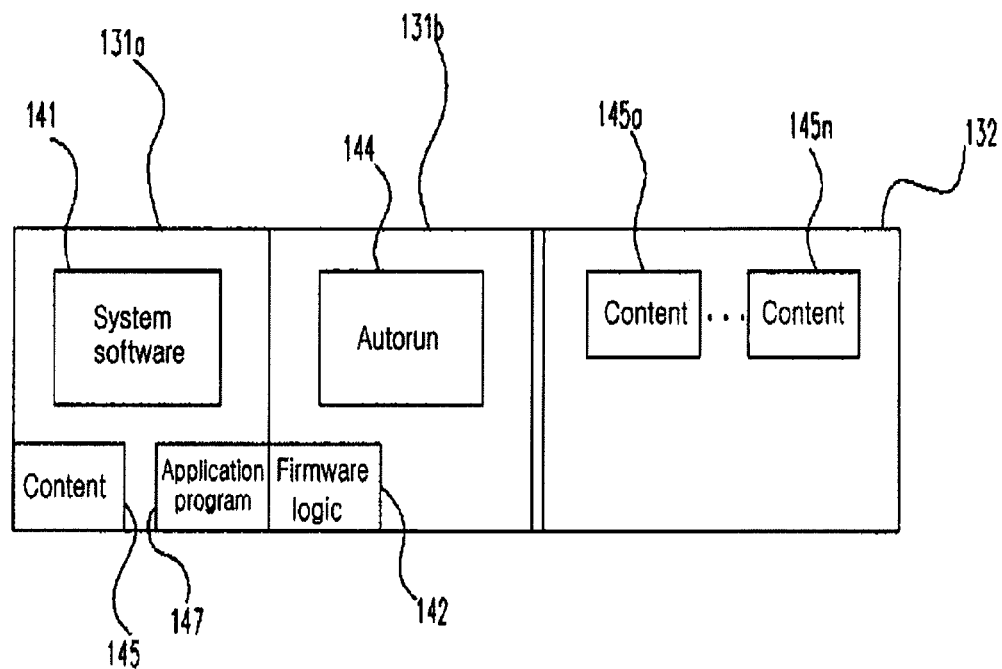

[Figure 9]
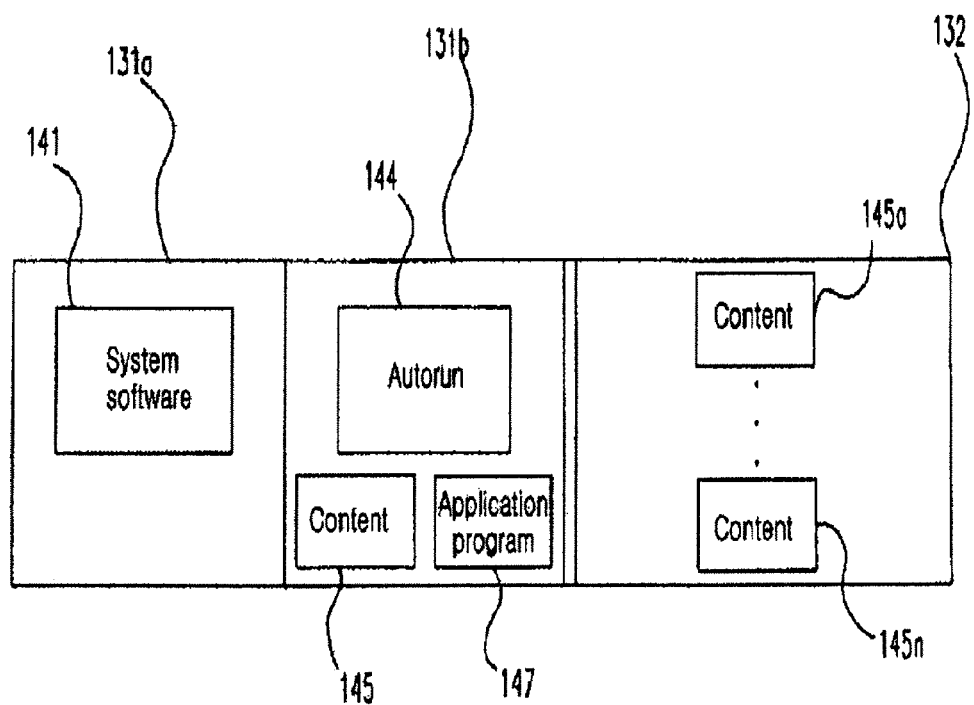

[Figure 10]
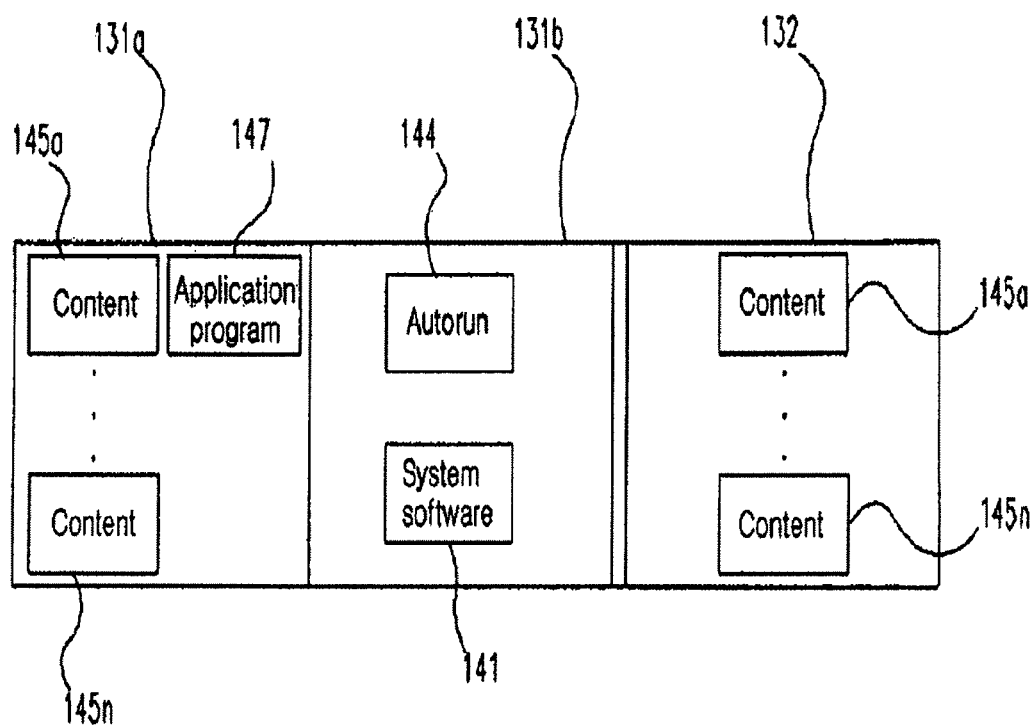

[Figure 11]
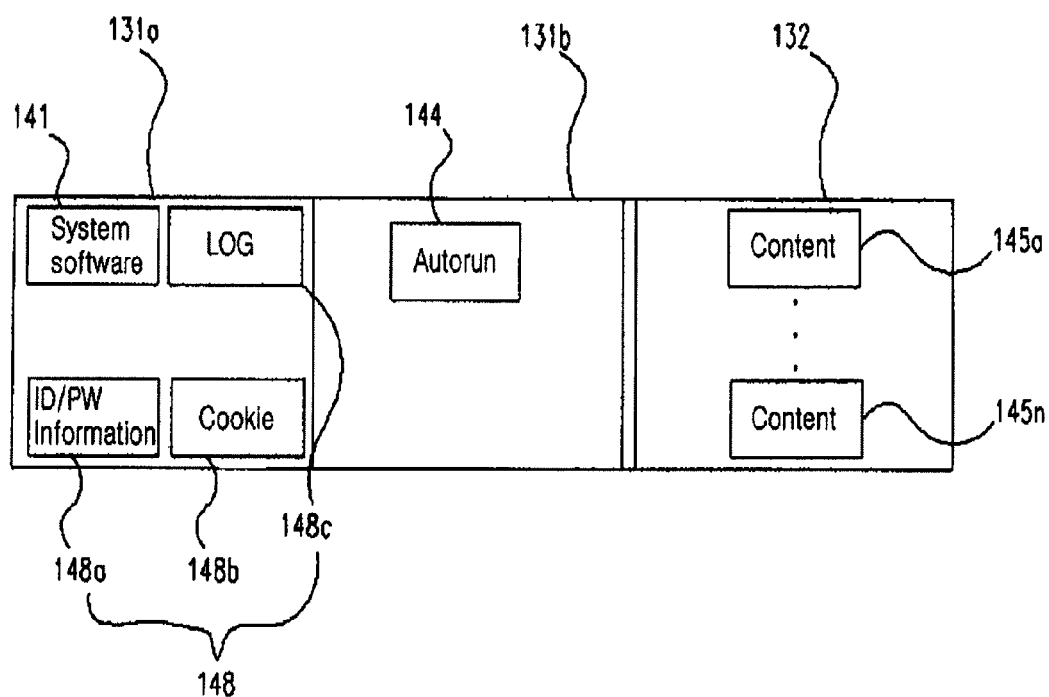

[Figure 12]
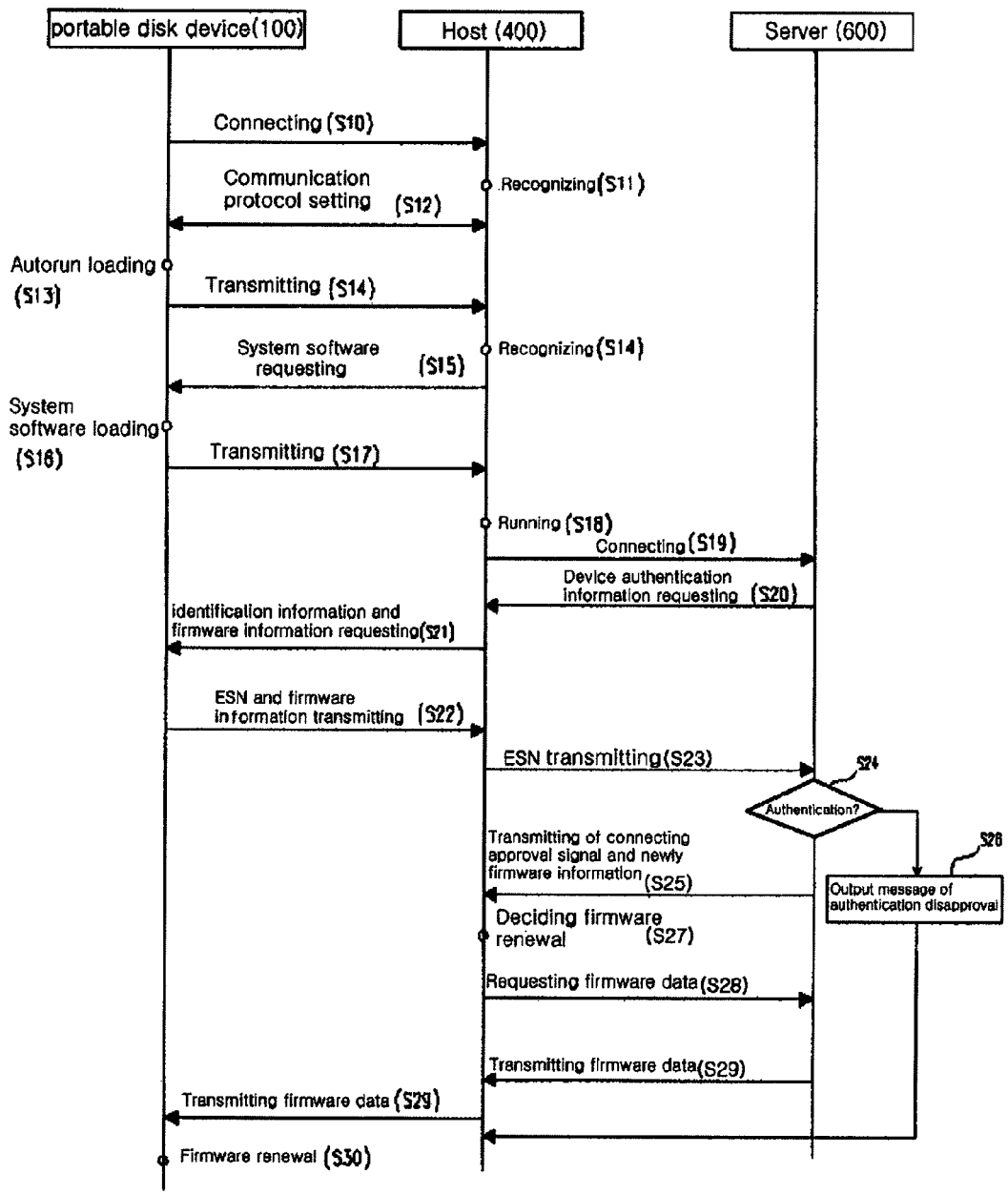

DEVICE FOR PROCESSING INFORMATION AND WORKING METHOD THEREOF

CROSS REFERENCE TO RELATED APPLICATIONS

This application is a Continuation of U.S. application Ser. No. 12/089,186, filed Aug. 11, 2008, now U.S. Pat. No. 7,797,504 which is the national phase under 35 U.S.C. §371 of PCT International Application No. PCT/KR2007/000528 which has an International filing date of Jan. 31, 2007, which designated the United States of America and which claims priority on Korean Patent Application No. 10-2006-0130958 filed on Dec. 20, 2006. The entire contents of which are incorporated by reference herein.

BACKGROUND OF THE INVENTION

1. Field of the Invention

The present invention is directed to a device for processing information, particularly, a device for processing information and working method thereof.

2. Discussion of the Background Art

Recently, an information type of machine like personal computer, fax, scanner, printer, etc.; an A/V machine like TV, set-top box, DVD, VCR, audio, camcorder, game, etc.; and a control type of machine like coffee maker, electric rice-cooker, refrigerator, washer, microwave oven, camera, etc. have progressed to transmit and receive a variety of information through network.

These various machines used in network are connected as USB, IEEE1394, telephone line, power line, wireless LAN or Bluetooth. Generally, it is not easy to construct total network because various machines in network construct different sub-networks from each other, and each machine is operated in different hardware and software platforms from each other.

Thus, as a method of constructing the total network, it is proposed to construct a common imaginary computer environment called middleware in dispersed machines, and add an application thereto. The middleware is software for communication between different types of devices, and enables various machines to communicate in network. Also, the middleware is placed between operating system and application program, and transparently connects service client with application dispersed in service client and server environment, and dispersed data. UPnP, one of the middleware technology, was proposed in UPnP forum. The UPnP forum was established in Oct. 18, 1999, and is an association of about 200 companies in the fields of home appliance, computer, home automation, and mobile apparatus. This forum establishes and announces the standards of device and service on the basis of internet-based communication standard, and aims to control the devices by constructing a network in home or office simply and easily.

In case of the total network described above, a simple network to be able to construct a network as easily as possible is desirable because there are many cases in which separate network managers do not exist, and users do not know the network well. Especially, a method to control a client at the same time the client connects to a host has been studied. Also, web-sync and PC-sync technology have been used for processing information of multi-media device like cellular phone or MP3 player, or protecting copyright. These technologies are commonly provided through CD or separate storage media, in case of device driver, controlling S/W, and application S/W.

Recently, the performance of a terminal connected to wire or wireless internet is affected by a firmware that is a middle level of hardware and software, as well as having hardware feature and software feature, and the main function of the terminal is embodied as software or firmware. Since software and firmware having a variety of functions are linked and operated, and so unexpected errors of software or firmware that were not shown in a developing stage are shown when users use it. To recover from these errors, previously in the art, users had to directly download a cure file from the homepage of a device manufacturing company, or directly find and update a distribution version file.

Also, new function can be added to a terminal by using software or firmware only, without changing hardware, and so updating of software and firmware is frequently made. Thus, a new technology to automatically perform update of software and firmware has been required.

Moreover, in upgrading firmware, since program down module needed for upgrade is included in a firmware image upgraded. Thus, if upgrading fails, the program down module cannot be operated. In the case, special tool, like JTAG, ROM writer, etc., is needed for recovering it. That is, the above kind of firmware is generally stored in mask ROM in a controller set in a terminal. As is well-known, the mask ROM is a memory in which contents are already recorded in a manufacturing process, and the contents cannot be changed by users. Thus, if a semiconductor company manufactures a new type or standard of memory, a preexisting controller in the art cannot support the new memory because of the mask ROM. Also, it is impossible to modify or upgrade firmware.

Further, to update firmware, users had to directly visit A/S center or connect to the homepage.

SUMMARY OF THE INVENTION

One object of the present invention is to provide a device for processing information which automatically updates firmware recorded and stored inside of the device without extra input of user.

Another object of the present invention is to provide a device for processing information that can easily perform update of firmware, though the firmware is frequently updated, by recording a logic part in charge of driving of the firmware in a separate flash memory type of memory.

Especially, another object of the present invention is to provide a device for processing information which divides the memory logically, stores a program or contents operated in a host in each divided area, and easily updates the program or contents.

Further, another object of the present invention is to provide a updating method of the above device for processing information, a communication method of the device with a host or server, and a working method of the device.

DESCRIPTION OF DRAWINGS

FIG. 1 is a view for describing a use example of a device for processing information according to a preferable embodiment of the present invention;

FIG. 2 is a schematic block diagram illustrating a mobile communication terminal according to a preferable embodiment of the present invention;

FIG. 3 is a schematic block diagram illustrating a MP3 player according to a preferable embodiment of the present invention;

FIG. 4 is a schematic block diagram illustrating a USB driver according to a preferable embodiment of the present invention;

FIG. 5 is a view illustrating a memory of a USB driver according to a preferable embodiment of the present invention;

FIG. 6 is a view illustrating constitution of the memory in FIG. 5 in detail;

FIGS. 7 to 11 are views illustrating constitution of the memory according to another embodiment of the present invention; and FIG. 12 is a flow chart illustrating an updating process of firmware according to one embodiment of the present invention.

DESCRIPTION OF THE PREFERRED EMBODIMENTS

The device for processing information according to one embodiment of the present invention comprises a memory in which a firmware logic is stored; a connecter that connects the memory to outside device; and a controller that provides an interface to a host, communicates with the host through the connecter, and reads and writes data to the memory, wherein the controller comprises a first storing means in which a routine for calling the firmware logic stored in the memory is stored; and a processor of running the firmware logic stored in the memory by using the routine stored in the first storing means.

The firmware driving method of the device for processing information according to one embodiment of the present invention comprises: loading a firmware logic stored in a first logic area of a memory in which writing and deleting by an unauthorized user are restricted, onto a second storing means of a controller by using a firmware routine stored in a first storing means of the controller; and running the firmware logic loaded to the second storing means.

The communication method of a device for processing information according to one embodiment of the present invention comprises: connecting the device for processing information with a host, and running a system software included in the device for processing information in the host; loading an identification information stored in a first logic area of a memory to which writing and deleting by an unauthorized user are restricted, transmitting the loaded identification information to the host or a server connected with the host, and requesting an authentication for connection; and running an application program or contents stored in the first logic area, or a second logic area of the memory to which access is allowed by any user, in the host, when the authentication is approved.

Also, the data updating method of the device for processing information according to one embodiment of the present invention comprises: connecting the device for processing information with a host, and running a system software included in the device for processing information in the host; loading an identification information or a data information of the device for processing information stored in a first logic area of a memory in which writing and deleting by an unauthorized user are restricted, and transmitting the loaded identification information or a data information to a host or a server connected with the host, and confirming the update command of data; requesting an authentication for updating data stored in the first logic area in case of receiving the updating command; and updating data of the first logic area by receiving updated data from the host or server, when the authentication is approved.

The information processing method of the device for processing information according to one embodiment of the present invention comprises: connecting the device for processing information with a host, and running a system software included in the device for processing information in the host; transmitting a command information for running an application program or contents stored in a first logic area of a memory to which writing and deleting by an unauthorized user are restricted, or a second logic area of the memory to which access is allowed to any user, to the host deciding whether to input a signal requesting the application program or contents from the host; and running the application program or contents stored in the first logic area or the second logic area in the host, when the signal requesting the application program or contents is inputted.

In the device for processing information and working method thereof according to the present invention, the size of the controller can be reduced by storing the firmware logic in extra memory and storing the firmware routine in ROM of the controller. Thus, even micromini-controller is easily operated.

Also, the device for processing information according to the present invention can easily update by storing the firmware logic in extra memory, and so the firmware update for adding a variety of functions is very easy.

Also, the device for processing information according to the present invention can automatically update firmware inside when it is connected to the host or extra-device, and so is highly trustworthy to a user who updates the firmware.

Also, the device for processing information according to the present invention can protect firmware from hacking by recording the firmware logic in an area which an unauthorized user cannot access.

Also, the device for processing information and working method thereof according to the present invention performs authentication through unique authentication information of the device when it is connected to the host, extra-server or extra-device to update firmware, and so the authenticity of the product can be increased.

Also, the device for processing information according to the present invention divides a memory logically, stores a program or contents operated in the host in each divided area, easily performs update of the program or contents, and so can provide highly authentic product.

Hereinafter, preferred embodiments of the present invention will be explained in more detail with reference to the accompanying drawings.

FIG. 1 is a view for describing a use example of the device for processing information according to one preferable embodiment of the present invention. FIG. 2 is a schematic block diagram illustrating a mobile communication terminal according to the present invention. FIG. 3 is a schematic block diagram illustrating a MP3 player according to the present invention. Also, FIG. 4 is a schematic block diagram illustrating a USB driver according to the present invention.

The device for processing information of the present invention can be embodied in a variety of examples as shown in FIG. 1. That is, it can be embodied as portable disk device 100, MP3 player 200, mobile communication terminal 300, etc., and is not limited thereto.

In the present embodiment, the device for processing information is explained by MP3 player 200, portable disk device 100, or mobile communication terminal 300 only, but is not limited thereto, and may include other device, for example, PDA, PMP, etc.

In FIG. 1, the device for processing information 100, 200 or 300 may communicate with a server 600 through a host 400 or a network 500, or may organically operate by transmitting and receiving a signal with the host 400.

First, the constitution of a mobile communication terminal 300 will be described briefly.

In FIG. 2, the mobile communication terminal 300 comprises an operator 310 to output operation of a user inputted as signal, an OTG 320 to connect extra-peripheral device, a controller 340 to control a whole operation of the mobile communication terminal 300, a memory 330 storing an application program, a user data and a system data, (a user data and a system data, a memory 330 to store an application program), a power supply 350 to supply power, a display 370 to receive and display an output signal from the controller 340 to outside, a camera 360, and a speaker 380. Also, the mobile communication terminal 300 further comprises an outside communication part 390 comprising a GPS 391, an OFDM 392 to receive DMB broadcasting, a D/A converter 393 for voice and data communication, a RF 394 to receive output of outside communication part 390 by wireless, and handle a received signal by wireless, and an antenna 395. Hereinafter, detail descriptions for the mobile communication terminal 300 are well know in the art, and so will be omitted.

Next, the constitution of MP3 player 200 will be described briefly.

In FIG. 3, the MP3 player 200 comprises an operator 210 outputting signal according to input of user (an operator 210 to output operation of a user inputted as signal), a connecter 220 to be connected with the host 400 and transmit and receive an electric signal, a controller 240 to control a whole operation of the MP3 player 200, a memory 230 storing an application software, a system data and a user data such as MP3 files, and etc. (a user data and a system data like MP3 files, a memory 230 to store an application software, etc.), a power supply 250, a display 260 to receive and display output signal from the controller 240, and an earphone 270. Hereinafter, detail descriptions for the MP3 player 200 are well know in the art, and so will be omitted.

Next, the constitution of the portable disk device 100 will be described briefly.

In FIG. 4, the portable disk device 100 comprises a connecter 110 to be physically connected with the host 400 and transmit and receive an electric signal, a controller 120 to control a whole operation of the portable disk device 100, a memory 130 storing data like a user data, a system data, contents, and etc. (a user data and a system data, and a memory 130 to store data like contents, etc.).

In the constitution, the mobile communication terminal 300, the MP3 player 200, and the portable disk device 100 have a connecting part 110, 220 and 320 to connect with outside host 400, the controller 120, 240 and 340, and the memory 130, 230 and 330, as common and essential elements. The controller 120, 240 and 340 may further comprise other element to perform specific action according to each device, but have processors 121, 241 and 341 for processing, ROM 123, 244 and 343, and RAM 122, 243 and 342, as essential elements. The RAM 122, 243 and 342 included in the controller 120, 204 and 340 may be embodied as DRAM, SRAM, etc., and the ROM 123, 244 and 343 may be embodied as flash type of ROM, etc.

Hereinafter, the constitution and operation of the present invention will be described by the portable disk device 100 as one example in detail, but is not limited thereto, and can be applied to a variety of devices for processing information, like the mobile communication terminal 300 and the MP3 player 200 as well as the portable disk device 100.

Also, in the present embodiment, the operation will be described under Window environment of Microsoft Co. Ltd., as one example, but is not limited thereto, and it is clear to a skilled artisan in the art that it can be operated in a variety of OS (Operating System) environments.

FIG. 5 is a view illustrating the memory of the USB driver according to one embodiment of the present invention. FIG. 6 is a view illustrating the constitution of the memory in FIG. 5 in detail. Also, FIGS. 7 to 11 are views illustrating the constitution of the memory according to another embodiment of the present invention.

In FIG. 4, the portable disk device 100 comprises the connecter 110, the controller 120, and the flash type of memory 130. The controller 120 comprises the processor 121, the RAM 122, and the ROM 123.

In a prior portable disk device, firmware is burned in a mask type of ROM, and so update was not easy. Thus, in the present embodiment, a routine for calling firmware is stored in the ROM 123, and a firmware logic is stored in the memory 130. Thus, update of firmware can be achieved only by updating the firmware logic stored in the memory 130. The memory 130 is made of a flash type, and so is easy to read and write, and can update firmware much more easily than one recorded in a mask type of ROM in the art.

In case the processor 121 tries to load the firmware logic by using the firmware routine recorded in the ROM 123, buffering can be done by using the RAM 122, and the execution can be done by making the firmware logic stay in the RAM 122 by the firmware routine.

In FIG. 5, the memory 130 in which the firmware logic according to the present embodiment was recorded includes a first logic area 131 and a second logic area 132 that are divided logically.

The first logic area 131 is an area in which writing and deleting by an unauthorized user are restricted, and the second logic area 132 is an area in which any user can read, write, watch, and delete contents freely. The area division like the above is set up at the time of manufacture, and the first logic area 131 is an area in which an authorized user using a separate tool is allowed to write and delete.

The first logic area 131 is divided to a hidden area 131a and an applicable area 131b, as shown in FIG. 6.

The hidden area 131a is constructed as file system that Window OS system of Microsoft Co. Ltd. does not recognize. Only an authorized user using separate tool (for example, API: Application Program Interface) can read, write, watch and delete data in the hidden area 131a, which an unauthorized user cannot access for reading, writing, watching and deleting. Thus, the area is not displayed in the detector, Explorer.exe, loaded in Window of Microsoft Co. Ltd., and so an unauthorized user cannot access it.

In FIG. 7, a firmware logic 142 is recorded in the hidden area 131a. Thus, for updating, a part of the function capable of accessing the hidden area 131a among the functions of API is added to the system software 141, and then the firmware logic 142 recorded in the hidden area 131a is updated by the system software 141.

Also, fundamental information of the potable disk device such as system data of VID (Vender ID, not shown), PID (Product ID, not shown), ESN (Electronic Serial Number, 143), etc. is recorded in the hidden area 131a.

In case the firmware logic 142 is recorded in the hidden area 131a, it is preferable that the address information of the hidden area 131a in which the firmware logic 142 is recorded is included in the firmware routine recorded in the ROM 123. Thus, the processor 121 of the controller 120 can access the firmware logic 142 by the address information, and can load and perform the firmware logic 142.

Also, the system software 141 which operate in the host 400 and performs such various functions as firmware update and access to the server 600 may be recorded in the hidden area 131a.

As shown in FIG. 7, the hidden area 131a may be constructed as one which can store all of the system data, the firmware logic 142 and the system software 141, or may be plural ones which can store the system data, the firmware logic 142 and the system software 141 in each separate area.

Also, as shown in FIG. 8, the firmware logic 142 is recorded in the applicable area 131b so that the processor 121 of the controller 120 can load and operate the firmware logic 142 recorded in the applicable area 131b by using routine of the ROM 123 onto the RAM 122.

The applicable area 131b is one to recognize as CD-ROM (RW), set up to be recognized as imaginary device under the Window of Microsoft. Co. Ltd. The function of Autorun.exe 144 including a driving command information is operated in the applicable area 131b. Thus, in case the portable disk device 100 is connected to the host 400, an application program 147 or contents 145a to 145n stored in a setting position of the memory 130 or the host 400 can be operated by the Autorun.exe 144. At this time, as shown in FIG. 9, applicable contents 145 or the application program 147 may be stored in the applicable area 131b itself.

Also, re-writing (RW) can be done in the applicable area 131b, which also can be done by the system software 141 or the API. The applicable area 131b is displayed as extra-host driver in Explorer.exe of Microsoft. Co. Ltd.

Also, reading and copying of recorded data, contents 145, or application program 147 are possible, but data, contents 145 or application program 147 cannot be deleted because it is imaginary CD-ROM. Only, it is done by the system software 141 or the API.

The sizes of hidden area 131a and the applicable area 131b may be varied by the system software 141 that is stored in the hidden area 131a and operated by the host 400. The system software 141 is performed in the host 400, but is operated as a middleware or a platform to a client device. That is, it can run a variety of application programs 147 and play contents 145a to 145n of multi-media file, etc., according to input of a user, by predetermined programming logic, and can regulate a size between the above areas according to addition of the API function.

For example, in case the size of data stored in the hidden area 131a is increased by addition or updating of data, the size of the hidden area 131a is increased, and when the size of data in the hidden area 131a is decreased by updating the size of the hidden area 131a can be decreased to use the applicable area 131b or the second logic area 132 more broadly.

On the other hand, all of the firmware logic 142 and the system software 141 may not be stored in the hidden area 131a, but as shown in FIG. 10, the firmware logic (not shown) may be stored in the hidden area 131a, and the system software 141 having the function of firmware update may be stored in a separate applicable area 131b. It is preferable that the system software 141 is automatically run by the Autorun.exe 144 when the portable disk device 100 is connected to the host 400.

Also, as shown in FIGS. 7 to 11, contents 145a to 145n and application program 147, such as client program for VOIP communication, etc. may be stored in any one area of the hidden area 131a, the applicable area 131b, and the second logic area 132.

The second logic area 132 is an area in which any user can freely read and write, and a user can freely record data, contents 145a to 145n, or application program 147, or read data stored in the second logic area 132.

If the connecter 110 is connected to the host 400, the second logic area 132 can be divided into an area which is immediately displayed in file finder program, like Explorer.exe of Microsoft Co. Ltd., and a security area that is displayed in case a password or user information is inputted.

Also, in the first logic area 131, especially the hidden area 131a, as shown in FIG. 11, derivation data 148 such as a cookie file 148b, a log file 148c, a user ID, a password information 148a, and etc. may be recorded. The derivation data 148 may be occurred while the portable disk device 100 communicates with the host 400, the server 600, or other device. (derivation data 148 occurring while the portable disk device 100 communicates with the host 400, the server 600, or other device, for example a cookie file 148b, a log file 148c, a user ID, a password information 148a, etc., may be recorded.)

It is achieved by the system software 141. For example, in case of doing VOIP communication by running the client program for VOIP communication, when a user connects to the server providing VOIP service, and inputs ID and password for authentication, they are caught and stored in the first logic area 131, and the cookie file created when connecting to the server is stored in the first logic area 131. So, in case of re-connecting, connection can be simply made by using the cookie file and the authentication information.

Hereinafter, the firmware update process of the portable disk device 100 according to the present embodiment will be described in detail.

FIG. 12 is a flow chart illustrating the process of updating firmware according to one embodiment of the present invention.

In FIG. 12, first, if a device, that is, a connecter 110 of the portable disk device 100, is connected to the host 400 (S10), the host 400 recognizes this (S11).

Next, the host 400 performs a well-known setting process for communication with the portable disk device 100, that is, communication protocol matching process (S12).

Then, an auto-executing program of the applicable area 131b, that is, Autorun.exe 144, is loaded (S13), and then transmitted to the host 400 (S14).

Accordingly, the host 400 performs the Autorun.exe 144 (S14), and then asks the portable disk device 100 (S15) for the system software 141.

Next, the portable disk device 100 transmits the system software 141 stored in the hidden area 131a or the applicable area 131b of the first logic area 131 to the host 400 (S17).

The host 400 runs the system software 141 received from the portable disk device 100 (S18), and is connected to a remote server 600 by the system software 141 (S19).

And, the server 600 requests an authentication information for authentication of the portable disk device 100 that it intends to connect (S20), through the system software 141, and then the system software 141 asks the portable disk device 100 for an identification information for authentication and a version information of firmware driving now (S21).

Next, the portable disk device 100 transmits the identification information comprising ESN 143 and firmware version information recorded in the first logic area 131 (the identification information recorded in the first logic area 131, that is, ESN 143 and firmware version information,) to the host 400 (S22), and then the system software 141 operated in the host 400 transmits the ESN 143 to the server 600, and requests authentication (S23).

The server 600 searches and matches a database (not shown) for authentication by using (as) the ESN 143 (S24).

In case the authentication is not done, a message of non-authentication is transmitted to the host 400 (S26).

When authenticated, a connection approval signal and a new firmware version information are transmitted to the host 400 (S25).

Then, the system software 141 of the host 400 decides update of firmware by comparing a firmware information operating in the portable disk device 100 with a new firmware information received from the server 600 (S27).

If it is decided that an old version of firmware is operated, the system software 141 asks the server 600 (S28) for updating data of the firmware, receives newest firmware data, and transmits it to the portable disk device 100 for updating (S29 and S30).

On the other hand, in performing a step to determine update of firmware of the system software 141, the firmware information may be stored in the device itself, that is, the portable disk device 100, and the information about firmware can be obtained from the portable disk device 100 according to operation of in the host 400.

Also, the decision of update of firmware may be performed in the server 600, not the host 400. That is, if the host 400 is connected to the server 600 through the system software 141, the system software 141 transmits the firmware information stored in the portable disk device 100 to the server 600. Accordingly, the server 600 decides whether to update or not by comparing a new firmware information with the firmware information of the portable disk device 100. If decided that update is needed, the data needed for update is transmitted to the host 400.

Also, the system software 141 operated in the host 400 provides a list of application programs 147 or contents 145*a* to 145*n* stored in the memory 130 of the portable disk device 100, and so makes them usable. At this time, selected application program 147 or contents 145*a* to 145*n* may be automatically updated through communication with the server 600 in case update is needed.

Also, when the system software 141 is operated, all of application program 147 or contents 145*a* to 145*n* stored in the hidden area 131*a* and the applicable area 131*b* as well as firmware can be automatically updated.

Here, the program stored in the system area may be, for example, a program to control a remote device, a mail client program, a client program for VOIP communication, etc.

Also, the ESN 143 may be used as authentication means for playing application program 147 or contents 145*a* to 145*n* stored in the memory 130 of the portable disk device 100. That is, if a user requests playing of application program 147 or contents 145*a* to 145*n*, the system software 141 confirms and plays the ESN 143, (confirms the ESN 143 to play,) thereby achieving the authentication for playing application program 147 or contents 145*a* to 145*n*.

Also, the portable disk device 100 of the present embodiment may be embodied in a multi-chip package type of the controller 120 and the memory 130. The multi-chip package is well-known in the art, and so detailed descriptions thereon are omitted. If embodied in such a multi-chip package as the above, a slim type of portable disk device 100 can be made. And, it is applicable to mobile communication terminal 300 and MP3 player 200 enough to embody a slim type of device.

Also, in the present embodiment, the second logic area 132 is an area that any user can freely access. Thus, if an application program 147 or contents 145*a* to 145*n* are recorded in the second logic area 132, the user can delete it. In this case, it can be made that the whole data recorded in the second logic area 132 is recorded in the first logic area 131, that is, the hidden area 131*a* or the applicable area 131*b*, and the data recorded in the first logic area 131 is copied onto the second logic area 132, in case any or all of the whole data is deleted, when the system software 141 confirms the second logic area 132.

This is to prevent deletion of the data by carelessness of a user. For example, in case an anti-virus program is stored, when the anti-virus program is removed from the second logic area 132, a backup anti-virus program of the first logic area 131 is automatically copied by the system software 141, whereby the user need not request A/S according to the data deletion.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

According to the device for processing information and the working method thereof, the firmware logic is separately stored in a memory and the firmware routine is stored in the ROM of the control unit so that the size of the control unit can be significantly reduced and a very small-sized control unit can be implemented.

Moreover, the device for processing information according to the present invention is convenient to update by storing the firmware logic in a separate memory and is very easy to update the firmware such that various function are added.

Since the device for processing information of the present invention automatically updates the firmware when being connected to the host or other devices, high reliability of updating the firmware is achieved.

According to the device for processing information of the present invention, since the firmware logic is recorded in a region to which a certain user cannot access, the firmware is prevented from being hacked.

Moreover, according to the device for processing information and the working method thereof in accordance with the present invention, the authorization must be succeed with an identification information of the information processing apparatus when the device for processing information is connected to the host, a server, or other devices for the update of the firmware, so that the reliability increases.

According to the device for processing information of the present invention, since the memory is divided logically such that a program or contents, executed in the host, are stored in the divided regions and the update of the program or the contents is easily performed, a product with high reliability can be provided.

The invention claimed is:
1. An information processing device, comprising:
a memory including a first logic area and a second logic area; and
a controller configured to control the memory, and
wherein the first logic area is not deletable,
wherein the second logic area is recordable or deletable,
wherein the controller is configured to store into the second logic area the same data as at least one program or content stored in the first logic area,
wherein the controller is configured to copy the data from the first logic area, and wherein if data recorded in the second logic area is deleted, the controller is configured to automatically copy the data corresponding to the deleted data from the first logic area to the second logic area.

2. The information processing device of claim 1, wherein the first logic area further stores a firmware driving logic.

3. The information processing device of claim 2, wherein the first logic area comprises:
 a hidden area which is accessible only by an authorized user,
 wherein the firmware driving logic is stored in the hidden area.

4. The information processing device of claim 1, wherein the information processing device is a Universal Serial Bus (USB) storage device.

5. The information processing device of claim 1, wherein the controller comprises:
 a first storage unit configured to store a routine to call a firmware driving logic stored in the first logic area; and
 a processor configured to execute the firmware driving logic stored in the first logic area, using the routine stored in the first storage unit.

6. The information processing device of claim 5, wherein the controller further comprises:
 a second storage unit providing a space for loading and executing the firmware driving logic.

7. The information processing device of claim 6, wherein the first storage unit is a Read Only Memory (ROM) and the second storage unit is a Random Access Memory (RAM).

8. The information processing device of claim 1, wherein the first logic area further stores another program or contents.

9. The information processing device of claim 1, wherein the controller and the memory are formed in a multi-chip package type.

10. The information processing device of claim 1, wherein the first logic area stores a system software to record or update a firmware driving logic, an application program, or contents in the memory, by communicating with a host.

11. The information processing device of claim 10,
 wherein the system software is executed by the host, and
 wherein the system software is configured to download the firmware driving logic from the host or a server connected to the host for recording or updating.

12. The information processing device of claim 10, wherein the system software is downloaded or updated from the host or a server connected to the host.

13. The information processing device of claim 1, wherein the first logic area is not deletable by a user, and the second logic area is recordable or deletable by the user.

14. An information processing device, comprising:
 a memory including a first logic area and a second logic area; and
 a controller configured to control the memory, and
 wherein the first logic area is not deletable,
 wherein the second logic area is recordable or deletable,
 wherein the controller is configured to store into the second logic area the same data as at least one program or content stored in the first logic area,
 wherein the controller is configured to copy the data from the first logic area, and
 wherein the first logic area includes an applicable area in which watching and reading by any user are allowed.

15. The information processing device of claim 14, wherein the applicable area stores a driving command information for executing contents or a program.

16. An information processing device, comprising:
 a memory including a first logic area and a second logic area; and
 a controller configured to control the memory, and
 wherein the first logic area is not deletable,
 wherein the second logic area is recordable or deletable,
 wherein the controller is configured to store into the second logic area the same data as at least one program or content stored in the first logic area,
 wherein the controller is configured to copy the data from the first logic area, and
 wherein the first logic area comprises a hidden area which is accessible only by an authorized user and an applicable area in which watching and reading by any user are allowed.

17. The information processing device of claim 16,
 wherein the controller comprises a first storage unit storing a routine to call a firmware driving logic stored in the first logic area, and
 wherein the first storage unit is configured to record an address information of the firmware driving logic stored in the first logic area.

* * * * *